United States Patent
Arp et al.

[11] Patent Number: 6,167,463
[45] Date of Patent: Dec. 26, 2000

[54] FIRM ADDRESSING FOR DEVICES ON A FIBRE CHANNEL ARBITRATED LOOP

[75] Inventors: Ronald K Arp; Jeffrey J Bain, both of Greeley, Colo.

[73] Assignee: Hewlett-Packard Company, Palo Alto, Calif.

[21] Appl. No.: 09/288,408

[22] Filed: Apr. 8, 1999

[51] Int. Cl.[7] ........................ G06F 3/00
[52] U.S. Cl. ............... 710/9; 710/10; 710/126; 710/129
[58] Field of Search ..................... 710/126, 129, 710/3, 8, 9–10, 128

[56] References Cited

U.S. PATENT DOCUMENTS

| | | | |
|---|---|---|---|
| 5,901,151 | 5/1999 | Bleiweiss et al. | 370/480 |
| 5,941,972 | 8/1999 | Hoese et al. | 710/129 |
| 6,041,381 | 3/2000 | Hoese | 710/129 |

*Primary Examiner*—Ario Etienne
*Attorney, Agent, or Firm*—Augustus W. Winfield

[57] ABSTRACT

Devices for a Fibre Channel Arbitrated Loop are initially unconfigured, and during the first loop initialization, arbitrate as a soft addressed device. The chosen address is then stored in non-volatile memory. Once an address is stored in non-volatile memory, during subsequent loop initializations, the device arbitrates as a hard address device. Because the address was chosen during a standard Fibre Channel Loop Initialization Process, the risk of future hard address conflicts is greatly reduced. Preferably, however, firm addresses may be erased by operator control, or by system command. Firm addressing provides the fixed address benefits of hard addressing, but substantially reduces the risk of hard address conflicts, while remaining compatible with the ANSI standards for Fibre Channel.

3 Claims, 2 Drawing Sheets

FIRM ADDRESSING FOR DEVICES ON A FIBRE CHANNEL ARBITRATED LOOP

FIELD OF INVENTION

This invention relates generally to computer systems and more specifically to computer systems interconnected using Fibre Channel.

BACKGROUND OF THE INVENTION

Computer processors and peripheral devices communicate via internal bus systems or channels, through local interfacing such as the Small Computer System Interface (SCSI), and over longer distances through networks. One standard interconnection system for a building or campus is the Fibre Channel (ANSI X3T11). Most interconnection systems for computer systems have a limit on the total number of devices, and a limit on the overall length of interconnection. For example, SCSI is limited to 16 connected devices, with a maximum overall distance of 26 meters. In contrast, Fibre Channel can support $2^{24}$ (about 17 million) devices ("nodes"), with a distance limit of 10 km between nodes. Fibre Channel supports a matrix interconnection called a fabric. Fibre Channel also supports a loop topology, called Fibre Channel Arbitrated Loop (FC-AL), which supports up to 127 nodes with a maximum distance of 10 km between nodes. Fabrics and loops can co-exist. In particular, a device logically connected into a Fibre Channel Arbitrated Loop may also be a port to a fabric.

In general, interconnection of devices in a computer system requires every connected device to have some sort of unique electronic address or identification. In some interconnection systems, device identification is determined by switches or cables, and cannot be electronically changed (referred to as hard addressing in Fibre Channel). For example, for personal computers, identification of a disk drive may be determined by setting switches on the drive, or identification may be determined by which connector is used to attach the drive. In other interconnection systems, devices may automatically be electronically configured each time system power is applied, or each time the system is reset (referred to as soft addressing in Fibre Channel). For automatic configuration, if a device is added or deleted, the assigned identification may change. For example, for Intel compatible personal computers, one industry specification for automatically configuring input/output (I/O) circuit boards is called the Plug and Play ISA Standards. For ISA Plug and Play, each compatible board has a unique identifier that includes a vendor identifier and a serial number. During system initialization, the host computer goes through a process of elimination, based on the unique board identifiers, to isolate each board, and the host computer then assigns a logical device number to each board. Historically, SCSI used hard addressing. An industry group has proposed an autoconfiguration protocol for SCSI, called SCSI Configured AutoMagically (SCAM). SCAM has not been universally adopted, however, and non-conforming legacy devices are still in use.

Hard addressing is useful for simplifying interaction between operating systems and peripheral devices. For example, existing operating system software designed for SCSI systems may have a specific built-in address for a boot device. Alternatively, consider a computer that initially boots from software on a removable compact disk (CD). After booting, it may be desirable for the computer to search for a hard disk, and assign the loop address of the hard disk to be the permanent boot device. If the hard disk has hard addressing, then the loop address of the boot device can remain constant for the computer. However, conflicting hard addresses must typically be resolved by human intervention. That is, a human must find the conflicting devices and physically change at least one address. For personal computers, and for SCSI systems with a maximum of 16 devices, finding conflicting addresses is practical. For Fibre Channel, with nodes scattered over a campus, finding conflicting hard addresses is impractical.

Fibre Channel address assignments are automatically determined. At any time, nodes can be added or deleted. When nodes are connected, devices automatically log in and exchange operating parameters with an electronic matrix device (called a switch), or with other nodes if there is no switch.

Fibre Channel Arbitrated Loops support both hard and soft addressing. If there is an address conflict among hard addresses, a conflicting device will either fail to join the loop, and as a result will be inoperable, or the conflicting device will revert to soft addressing and choose some other address. Therefore, hard addressing is effectively restricted to the situation where the person installing a device knows the address of up to 126 other devices to be installed (or already installed) in the system. There is a need for hard addresses in Fibre Channel Arbitrated Loop systems, with a reduced risk of hard address conflicts.

SUMMARY OF THE INVENTION

Devices in accordance with the invention are initially unconfigured. That is, the device's Fibre Channel loop address is not set by switches or by any other form requiring operator intervention. When a device in accordance with the invention is attached to a Fibre Channel Arbitrated Loop for the first time, loop address assignment is automatically determined by a standard Fibre Channel Loop Initialization Process. Then, the resulting loop address is saved in nonvolatile memory. In the present patent document, a loop address that is automatically determined during autoconfiguration, but then remains fixed, is called a "firm" address. After initial configuration, the device is effectively hard addressed, and the device then responds as a hard configured device during future loop initialization. Because the firm address was chosen during a standard Fibre Channel Loop Initialization Process, there should be no address conflicts. Preferably, however, firm addresses may be erased by operator control, or by system command. Firm addressing provides the fixed address benefits of hard addressing, but substantially reduces the risk of hard address conflicts, while remaining compatible with the ANSI standards for Fibre Channel.

DETAILED DESCRIPTION OF THE PREFERRED EMBODIMENT OF THE INVENTION

Figure 1:
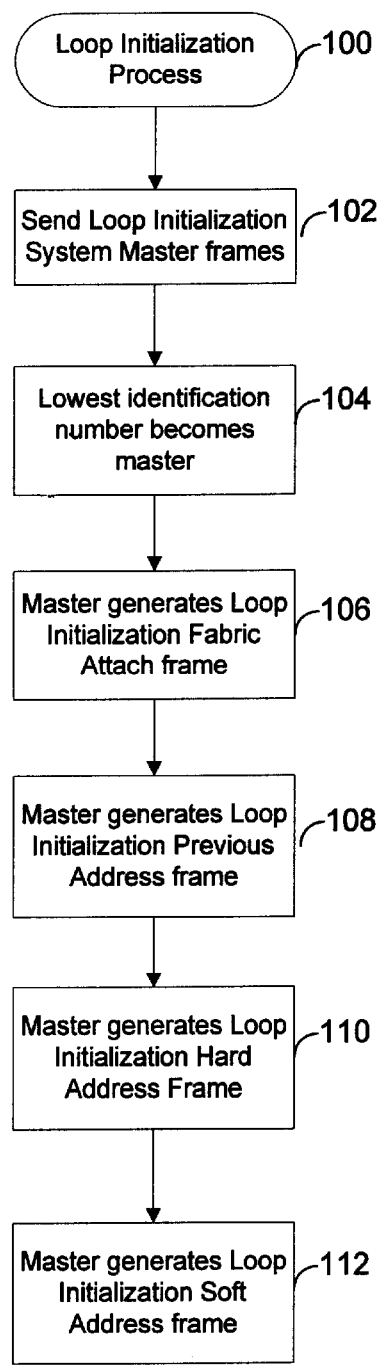
FIG. 1 is a flow chart of a prior art method for initialization of a Fibre Channel Arbitrated Loop.

FIG. 1 illustrates a flow chart of a prior art method of autoconfiguration by a device connected to a Fibre Channel Arbitrated Loop. Devices connected as a Fibre Channel Arbitrated Loop are logically connected in series, and variable length data frames are sequentially passed from one device to the next. The initialization procedure is called the Loop Initialization Process (LIP) or Loop Initialization primitive sequence (FIG. 1, 100). After power-on or a system reset, at least one device generates a Loop Initialization System Master (LISM) frame (step 102). Multiple devices may simultaneously generate LISM frames. Each device generating a LISM frame includes its unique Fibre Channel world-wide identification number as part of the frame. Each device receiving a LISM frame compares the identification number in the frame to its own identification number. If the receiving device has an identification number that is lower than the identification number in the LISM frame, the device substitutes its own identification number in the frame and then sends the modified LISM frame to the next device. If the receiving device has an identification number that is higher than the identification number in the LISM frame, the device sends the unmodified LISM frame to the next device. Eventually, all LISM frames will contain the one lowest identification number of all the devices connected to the loop. The device having the lowest identification number becomes the loop master (step 104). At step 106, the loop master device generates a Loop Initialization Fabric Attach (LIFA) frame, which is used to determine whether a loop device is also a port to a Fibre Channel fabric.

Next, the loop master device initiates an arbitration sequence during which each device chooses one of 127 loop addresses. The loop master device generates a series of frames, each of which includes a 127-bit number, each bit corresponding to one loop address. There are two possible scenarios. The loop may be in the process of being initialized for the first time after power-on or after a system reset. Alternatively, the loop may be initialized and running, and one or more new devices are being added to the loop. In general, when a new device is added to a running loop, all devices already configured keep their previously chosen loop addresses. Accordingly, at step 108, the master device first generates a Loop Initialization Previous Address (LIPA) frame, and each configured device sets one bit in the 127-bit address number that corresponds to its previously chosen loop address. Next (step 110), the master device generates a Loop Initialization Hard Address (LIHA) frame. If a new device is being added to a running loop, the 127-bit address number in the LIHA frame will have bits set previously when a LIPA frame was circulated. If the loop is being initialized for the first time, the LIHA frame will initially have no bits set. When a device having a hard address receives the LIHA frame, the device will set the bit in the 127-bit address number corresponding to its hard address. If the appropriate bit is already set, the device must either cease arbitrating, or switch to soft addressing (if possible). Finally, at step 112, the loop master device generates a Loop Initialization Soft Address (LISA) frame. For each device receiving the LISA frame, if an address was not chosen during a LIPA frame or a LIHA frame, then the device selects any available loop address, sets the appropriate bit in the 127-bit address number in the frame, and sends the frame to the next device in the loop.

Figure 2:
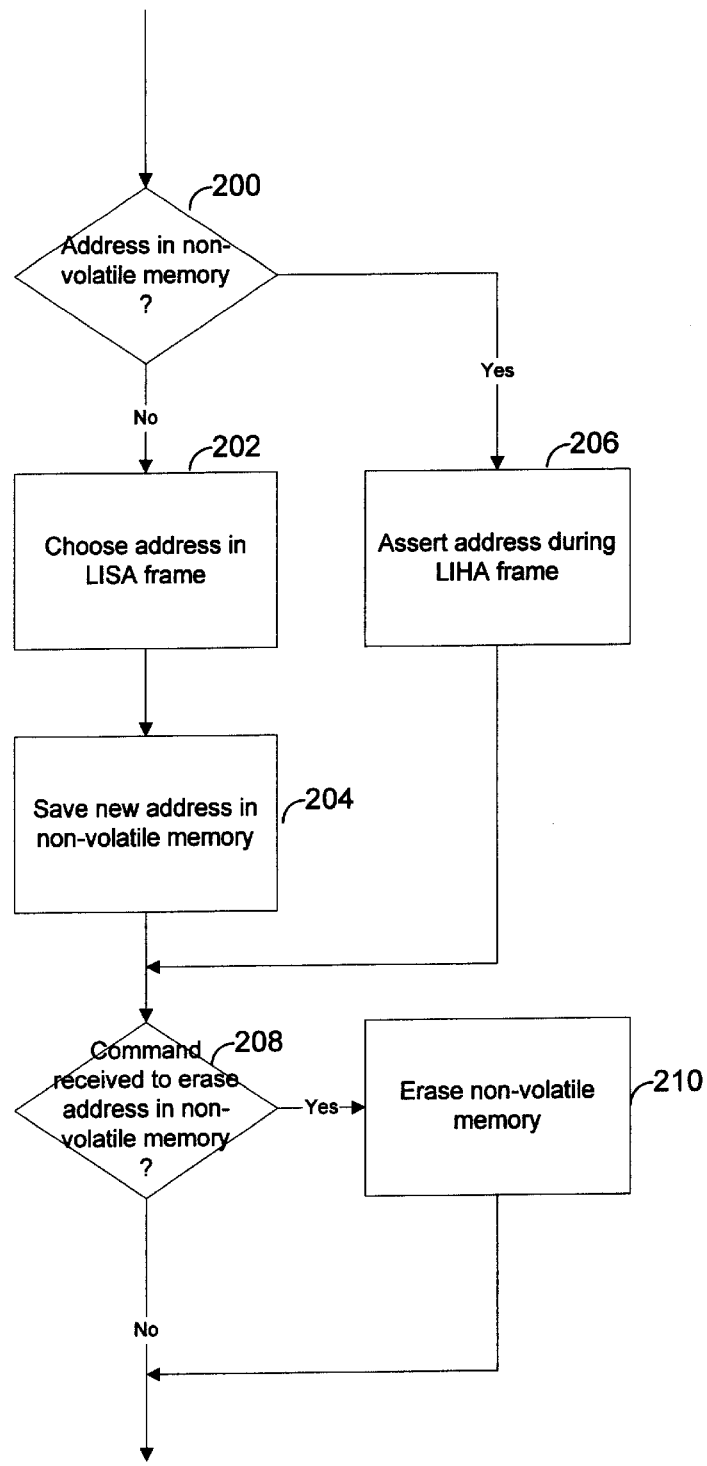
FIG. 2 is a flow chart of a method for initialization for a Fibre Channel Arbitrated Loop in accordance with the invention.

FIG. 2 is a flow chart illustrating a method of initialization by a device in accordance with the invention. A device in accordance with the invention is completely compatible with the standard initialization process illustrated in FIG. 1. The interaction of a device in accordance with the invention with the Loop Initialization Process for steps 100–108 of FIG. 1 is no different than any other Fibre Channel Arbitrated Loop device. However, a device in accordance with the invention responds differently at steps 110 and 112 of FIG. 1. Step 200 in FIG. 2 occurs before step 110 of FIG. 1. In FIG. 2, if a device in accordance with the invention is arbitrating for a loop address for the first time (either the first time the loop is initialized, or as a new device being added to a running loop), no loop address is present in non-volatile memory within the device, and the device chooses an available address from a LISA (soft address) frame (step 202). The device then stores the newly chosen loop address in non-volatile memory (step 204). Thereafter, when the device is arbitrating for a loop address, the device sets one bit, corresponding to its stored address, in the 127-bit address number within a LIHA (hard address) frame (step 206).

Since a firm address is chosen during an LISA (soft address) frame, after the LIHA (hard address) frame, there is little risk of a future hard address conflict. If there is a future hard address conflict for the firm address, a device in accordance with the invention responds as a standard Fibre Channel device, either ceasing to arbitrate or reverting to a soft address mode. Alternatively, FIG. 2 also illustrates that, preferably, firm addresses may be electronically erased, either by operator action (for example, from a front panel), or by system command (steps 208 and 210). For example, in case of a hard address conflict, a device in accordance with the invention may arbitrate as a soft address device, but continue to keep the firm address in non-volatile memory. If the firm address repeatedly conflicts, a computer monitoring the loop may command the device to erase the firm address in non-volatile memory. Once erased, the next time the device arbitrates for a loop address, it participates as a soft addressed device (step 202) and stores the newly chosen address in nonvolatile memory (step 204).

From the above discussion, it can be seen that firm addressing provides the following benefits:

(1) provides the fixed address benefits of hard addressing;
(2) substantially reduces the risk of address conflicts associated with hard addressing;
(3) provides alternatives in case of address conflicts; and
(4) provides complete compatibility with the ANSI standards for Fibre Channel.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for determining an address for a device connected to a Fibre Channel Arbitrated Loop, the method comprising the following steps:

determining whether an address is stored in non-volatile memory in the device;

when it is determined that the non-volatile memory contains an address, then using the address in the non-volatile memory as a hard address during a Fibre Channel loop initialization;

when it is determined that the non-volatile memory does not contain an address, then executing the following steps:

(a) choosing an address from a Loop Initialization Soft Address frame;

(b) storing the chosen address in the non-volatile memory in the device.

2. The method of claim 1, further comprising the following step:

arbitrating as a soft addressed device when a hard address conflict is detected.

3. The method of claim 1, further comprising the following steps:

detecting, by the device, an erase command; and erasing an address area within the non-volatile memory.

* * * * *